Patented Mar. 25, 1952

2,590,346

UNITED STATES PATENT OFFICE 2,590,346

CUPRIFEROUS DISAZO-DYESTUFFS

Henri Riat and Hans Mayer, Basel, Switzerland, assignors to Ciba Limited, Basel, Switzerland, a Swiss firm No Drawing. Application June 7, 1948, Serial No. 31,603. In Switzerland June 26, 1947

4 Claims. (Cl. 260—148)

According to this invention valuable new cupriferous disazo-dyestuffs are made by treating a disazo-dyestuff of the general formula

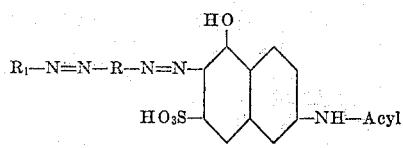

in which R represents a diphenyl radical which is bound in the 4- and 4'-positions to the azo linkages and contains in each of the 3- and 3'-positions an alkoxy group, and $R_1$ represents the radical of a 1:8-dihydroxynaphthalene sulfonic acid bound to the azo linkage in the 2-position, with an agent yielding copper until the alkoxy groups are split up.

The disazo-dyestuffs of the above general formula, which serve as starting materials in the present invention, may be obtained, for example, by coupling a tetrazotised 4:4'-diamino-3:3'-dialkoxydiphenyl with a 1:8-dihydroxynaphthalene sulfonic acid, on the one hand, and with a 2 - acylamino - 5 - hydroxynaphthalene - 7 - sulfonic acid, on the other. As examples of 1:8-dihydroxynaphthalene sulfonic acids there may be mentioned: 1:8 - dihydroxynaphthalene - 4 - sulfonic acid, 1:8-dihydroxynaphthalene-4:6-disulfonic acid and above all 1:8-dihydroxynaphthalene-3:6-disulfonic acid. As examples of 2-acylamino-5-hydroxynaphthalene - 7 - sulfonic acids there may be mentioned those containing an acyl radical of the formula —OC—$R_2$, wherein $R_2$ represents an aliphatic or aromatic radical free from solubilizing groups and containing up to 8 carbon atoms, such as 2-acetylamino-, 2-chloracetylamino-, 2-(4'-chlorobenzoylamino)-, 2-(2',4'-dichlorobenzoylamino)- or especially 2-benzoylamino - 5 - hydroxynaphthalene - 7 - sulfonic acid. For making the disazo-dyestuffs there are advantageously used 4:4'-diamino-3:3'-dialkoxydiphenyl compounds of which the alkoxy groups contain only a few carbon atoms such, for example, as 4:4'-diamino-3:3'-diethoxydiphenyl and above all 4:4'-diamino-3:3'-dimethoxydiphenyl.

The coupling of the tetrazotised 4:4'-diamino-3:3'-dialkoxydiphenyl with the coupling components of the kind defined above may be carried out in either order of succession. When 1:8-dihydroxynaphthalene-3:6-disulfonic acid is used it is generally of advantage first to couple the tetrazotised 4:4'-diamino-3:3'-dialkoxydiphenyl in a neutral to weakly alkaline medium with this coupling component, and then to couple the diazo-azo-compound so obtained with the 2-acylamino-5-hydroxynaphthalene-7-sulfonic acid in a somewhat more strongly alkaline medium and, if desired, with the addition of a small quantity of pyridine. The disazo-dyestuff may be separated from the coupling mixture before it is treated with an agent yielding copper. Alternatively, especially when the second coupling has been conducted in the presence of pyridine, the dyestuff may be treated with the agent yielding copper without separating the dyestuff from the mixture, that is to say, the agent yielding copper may be added, if desired, after neutralising or diminishing excess alkali, directly to the coupling mixture, and conversion into the complex copper compound brought about immediately, for example, by heating for several hours at 80–90° C., without separating the metal-free dyestuff.

As agents yielding copper for the present process there come into consideration, for example, salts of monovalent or divalent copper such as cuprous chloride or cupric sulfate, and also compounds which contain copper in complex union. In this connection there are especially suitable cuprammine complexes such, for example, as the complex copper compounds obtainable from ammonia, alkylamines such as ethylamine, morpholine, pyridine or piperidine. In order to bring about the formation of the copper complex with the complete splitting of the alkoxy groups in the disazo-dyestuffs used as starting materials it is generally necessary to conduct the treatment with the agent yielding copper at a raised temperature, for example, at 80–90° C., and for a period of several hours. It is of advantage to work in an aqueous medium. If desired, the treatment with the agent yielding copper may be conducted in the presence of a suitable addition. As such additions there may be mentioned bases such as ammonia or organic bases, advantageously an excess of the base which is already contained in the molecule of the cuprammine complex, when such a complex is used, or another agent capable of binding acid.

In some cases good results are obtained by conducting the treatment with an agent yielding copper by the process of U. S. patent application Serial No. 778,734 (now U. S. Pat. No. 2,536,957) for example, in the presence of an ethanolamine.

The cupriferous disazo-dyestuffs obtainable by the present invention are new and correspond to the general formula

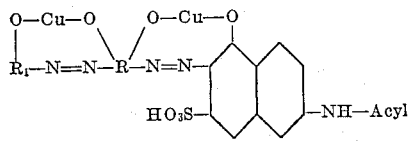

in which R represents a diphenyl radical which is bound in the 4- and 4'-positions to the azo linkage and in the 3- and 3'-positions to the —O—Cu—O— groups, and $R_1$ represents a naphthalene radical which is bound in the 1-position to the —O—Cu—O— group and in the 2-position to the azo linkage and which contains in the 8-position an HO-group and also contains at least one sulfonic acid group.

These cupriferous disazo-dyestuffs are suitable for dyeing or printing a very wide variety of materials, for example, animal fibers such as wool or leather. By virtue of their good affinity for vegetable fibers they are suitable above all for dyeing or printing cellulose materials such as linen, cotton, and artificial silk and staple fibers of regenerated cellulose. There are obtained principally blue tints which are in many cases distinguished by very good fastness to light. As compared with similar products, whose manufacture is described in French Patent No. 913,508 and U. S. Patent No. 1,889,732 the best comparable cupriferous dyestuffs of the present invention produce dyeings of considerably superior fastness to light.

The following examples illustrate the invention, the parts and percentages being by weight unless otherwise stated and the relationship of parts by weight to parts by volume being the same as that of the kilogram to the liter:

*Example 1*

36.4 parts of the sodium salt of 1:8-dihydroxynaphthalene-3:6-disulfonic acid and 25 parts of crystalline sodium acetate are dissolved in 250 parts of water, and coupled at 5° C. with the tetrazo compound from 24.4 parts of 4:4'-diamino-3:3'-dimethoxydiphenyl. The formation of the monoazo-dyestuff is completed by the gradual addition of 80 parts of sodium carbonate solution of 10 per cent. strength. 36.4 parts of the monosodium salt of 2-benzoylamino-5-hydroxynaphthalene-7-sulfonic acid and 30 parts of anhydrous sodium carbonate dissolved in 400 parts of water are then added, and the whole is stirred until the coupling is complete. The whole is heated to 80° C., sodium chloride is added, and the precipitated dyestuff is separated by filtration. (It dissolves in water with a blue coloration and dyes cotton reddish blue tints.)

In order to convert the dyestuff into its complex copper compound, it is dissolved in 2500 parts of warm water and mixed with a solution prepared from 50 parts of crystalline copper sulfate, 80 parts of ammonia solution of 25 per cent. strength and 150 parts of water. The whole is heated for 14 hours at 85° C. and then for 4 hours at 95° C. The dyestuff is then salted out, separated by filtration and dried. It is a dark powder which dissolves with a blue coloration in water and dyes cotton greenish dark blue tints. The dyeings in addition to having very good properties of wet fastness possess an excellent fastness to light.

*Example 2*

36.4 parts of the disodium salt of 1:8-dihydroxynaphthalene-3:6-disulfonic acid and 25 parts of crystalline sodium acetate are dissolved in 250 parts of water, and coupled at 5° C. with the tetrazo compound from 24.4 parts of 4:4'-diamino-3:3'-dimethoxydiphenyl. The formation of the diazoazo compound is completed by the gradual addition of 80 parts of sodium carbonate solution of 10 per cent. strength. 36.4 parts of the monosodium salt of 2-benzoylamino-5-hydroxynaphthalene-7-sulfonic acid and 15 parts of anhydrous sodium carbonate dissolved in 400 parts of water and 150 parts of pyridine are then added, and the whole is stirred until coupling is complete.

In order to convert the dyestuff into its complex copper compound the coupling mixture is made up to 2500 parts by volume by the addition of warm water and mixed at 50° C. with 250 parts of an ammoniacal solution of copper sulfate (corresponding to 50 parts of $CuSO_4.5H_2O$ and 13.6 parts of $NH_3$). The whole is heated for 14 hours at 85° C. and then for 4 hours at 95° C. The dyestuff of the formula

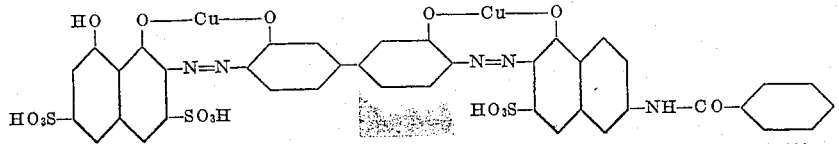

is precipitated from the solution by the addition of sodium chloride, separated by filtration and dried. It is a dark powder which dissolves in water with a blue coloration and dyes cotton greenish dark blue tints. The dyeings in addition to having very good properties of wet fastness possess an excellent fastness to light.

*Example 3*

36.4 parts of the disodium salt of 1:8-dihydroxynaphthalene-3:6-disulfonic acid and 25 parts of crystallized sodium acetate are dissolved in 250 parts of water and coupled at 5° C. with the tetrazo compound from 24.4 parts of 4:4'-diamino-3:3'-dimethoxy-diphenyl. The formation of the monoazo-dyestuff is completed by the gradual addition of 80 parts of sodium carbonate solution of 10 per cent. strength. 40 parts of the monosodium salt of 2-(para-chlorobenzoyl)-amino-5-hydroxynaphthalene-7-sulfonic acid, 15 parts of anhydrous sodium carbonate, and 100 parts of pyridine, dissolved in 300 parts of water, are then added, and the whole is stirred until the coupling is complete. (The resultant dyestuff dissolves in water with a blue coloration and dyes cotton blue tints.)

In order to convert the dyestuff into the complex copper compound, the coupling mixture is brought up to the 2500 parts volume by dilution with water, after which a solution prepared from 50 parts of crystallized copper sulfate, 80 parts of ammonia of 25 per cent. strength and 150 parts of water is added at 60° C. The reaction mass is heated to 85–90° C. for 20 hours and the dyestuff then salted out by the addition of sodium chloride, separated by filtration and dried. A dark powder is obtained which dissolves in water with a greenish blue coloration and dyed cotton greenish blue tints. The dyeings possess an excellent fastness to light.

*Example 4*

The tetrazo compound from 24.4 parts of 4:4'-diamino-3:3'-dimethoxydiphenyl is coupled with 36.4 parts of the disodium salt of 1:8-dihydroxynaphthalene-3:3-disulfonic acid and 40 parts of the monosodium salt of 2-(para-chlorobenzoyl)-amino-5-hydroxynaphthalene-7-sulfonic acid, following the procedure of Example 3. When the coupling is complete the disazo dyestuff is salted out at 70° C. and separated by filtration.

The dyestuff paste is stirred in water and finally a quantity of water added to bring up the total volume to 2500 parts. 10 parts of anhydrous sodium carbonate and 50 parts of monoethanolamine are added and the whole mixed at 50 to 60° C. with a solution prepared from 50 parts of crystallized copper sulfate, 90 parts of ammonia of 25 per cent. strength and 200 parts of water. The reaction mass is then heated to 80–90° C. for 20 hours, and the dyestuff of the formula

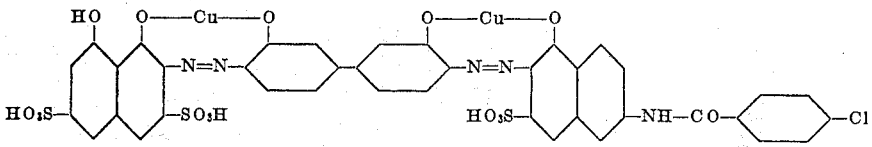

salted out by the addition of sodium chloride, separated by filtration and dried. It has practically the same properties as the cupriferous dyestuff obtained according to Example 3.

*Example 5*

36.4 parts of disodium salt of 1:8-dihydroxynaphthalene-3:6-disulfonic acid and 25 parts of crystallized sodium acetate are dissolved in water and coupled at 5° C. with the tetrazo compound from 24.4 parts of 4:4-diamino-4:4'-dimethoxydiphenyl. The formation of the monoazo-dyestuff is completed by the gradual addition of 80 parts of sodium carbonate solution of 10 per cent. strength. 30.3 parts of the monosodium salt of 2-acetylamino-5-hydroxynaphthalene-7-sulfonic acid and 20 parts of sodium carbonate, dissolved in 400 parts of water, are then added and the reaction mass stirred until the coupling is complete. The whole is heated to 70° C., sodium chloride is added and the precipitated dyestuff is separated by filtration. (It dissolves in water with a blue coloration and dyes cotton reddish blue tints.)

In order to convert the dyestuff into the complex copper compound, it is dissolved in 2000 parts of water after which 10 parts of anhydrous sodium carbonate and a solution of 50 parts of crystallized copper sulfate in 90 parts of ammonia of 25 per cent. strength, as well as 150 parts of water are added. The whole is then heated to 85–90° C. for 20 hours. The dyestuff of the formula

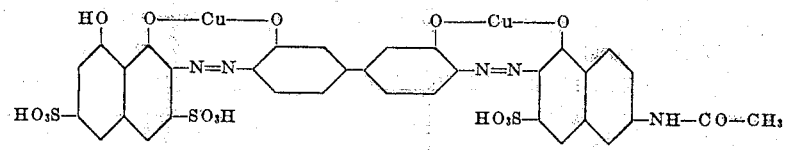

is salted out, separated by filtration, and dried. It is a dark powder which dissolves in water with a blue coloration and dyes cotton greenish blue tints. The dyeings in addition to having very good properties of wet fastness possess an excellent fastness to light.

*Example 6*

A dyebath is prepared with 3000 parts of water, 2 parts of the cupriferous dyestuff obtained as described in Example 2 and 40 parts of crystalline sodium sulfate. 100 parts of cotton are entered into the dyebath at 40° C., the temperature is raised to 95° C., and dyeing is carried on for 1 hour at this temperature. The cotton is then rinsed and dried. It is dyed a greenish dark blue tint, and the dyeing is distinguished by a very good fastness to light.

Having thus described the invention, what is claimed is:

1. A cupriferous disazo-dyestuff of the general formula

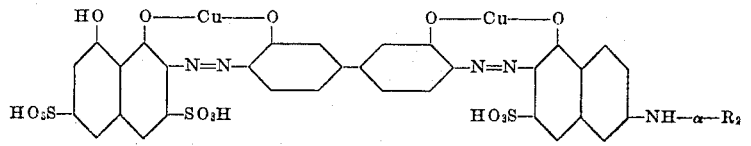

wherein R₂ stands for a radical selected from the group consisting of aliphatic and aromatic radicals free from solubilizing groups and containing up to 8 carbon atoms.

2. A cupriferous disazo-dyestuff of the formula

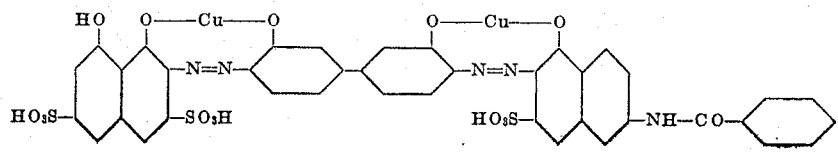

3. A cupriferous disazo-dyestuff of the formula

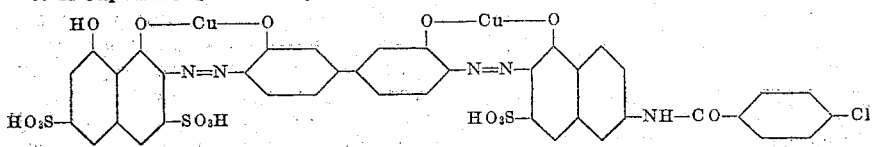

4. A cupriferous disazo-dyestuff of the formula

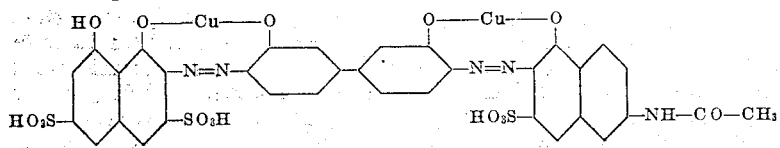

HENRI RIAT.
HANS MAYER.

REFERENCES CITED

The following references are of record in the file of this patent:

UNITED STATES PATENTS

| Number | Name | Date |
|---|---|---|
| 1,889,732 | Stusser et al. | Nov. 29, 1932 |
| 1,921,336 | Wiedemann | Aug. 8, 1933 |
| 1,921,337 | Wiedemann | Aug. 8, 1933 |
| 2,400,092 | Anderson | May 14, 1946 |
| 2,424,066 | Straub et al. | July 15, 1947 |
| 2,426,977 | Straub et al. | Sept. 9, 1947 |
| 2,536,957 | Riat et al. | Jan. 2, 1951 |

FOREIGN PATENTS

| Number | Country | Date |
|---|---|---|
| 469,901 | France | June 3, 1914 |

OTHER REFERENCES

Georgievics et al.: "Dye Chemistry," 1920, page 94.